Dec. 8, 1953 J. R. ANDERSON 2,662,120

MAGNETIC HEAD

Filed Feb. 18, 1950 2 Sheets-Sheet 1

INVENTOR
J. R. ANDERSON
BY
G. H. Heydt
ATTORNEY

Dec. 8, 1953 J. R. ANDERSON 2,662,120

MAGNETIC HEAD

Filed Feb. 18, 1950 2 Sheets-Sheet 2

INVENTOR
J. R. ANDERSON
BY
G. H. Heydt
ATTORNEY

Patented Dec. 8, 1953

2,662,120

UNITED STATES PATENT OFFICE 2,662,120

MAGNETIC HEAD

John R. Anderson, Berkeley Heights, N. J., assignor to Bell Telephone Laboratories, Incorporated, New York, N. Y., a corporation of New York Application February 18, 1950, Serial No. 145,027

2 Claims. (Cl. 179—100.2)

This invention relates to magnetic heads for use in magnetic recording, reproduction, or obliteration, and particularly to high frequency heads comprising laminated pole-pieces.

The object of the present invention is to provide a high frequency magnetic recording and reproducing head which will permit the efficient recording of microsecond electrical pulses in the smallest possible length of recording medium, and the reproduction of these pulses without frequency discrimination. Frequency discrimination is here taken to mean that which occurs in converting electrical current to recording flux or in converting flux in the head when reproducing to integrated open circuit voltage output.

In order to record electrical pulses of short duration successfully it is essential that the high frequency eddy current losses in the recording head be reduced to a minimum to minimize internal magnetic energy loss and thereby provide a strong magnetic energy for the recording medium, and that the magnetic flux reaching the recording medium be concentrated directly under the recording-reproducing gap and reduced to a minimum at all other points.

Eddy current losses are directly proportional to the square of the thickness of the individual lamina. Extremely thin laminae are therefore desirable for use in structures working at exceedingly high frequencies where eddy current losses are to be kept at a low value.

In accordance with this invention the above-noted requirements are satisfactorily met by a novel magnetic head which comprises a delta or triangular-shaped laminated core the laminae of which are not greater than 0.001 inch in thickness and are of a high permeability magnetic material such as the moly-Permalloy comprising 4 per cent molybdenum and 79 per cent nickel, knife-edged pole tips which approach the recording medium at an angle of approximately 45 degrees and thereby reduce the magnetic flux to a minimum at all points except directly under the recording-reproducing gap, and an eddy current shield of a material such as copper placed directly in front and directly behind the pole tips, which further prevents magnetic flux from reaching the recording medium at points other than that directly under the gap.

The nature of the invention and its distinguishing features and advantages will be more clearly understood from the following detailed description and the accompanying drawings in which like reference characters in the different figures designate similar elements and:

Figure 1:
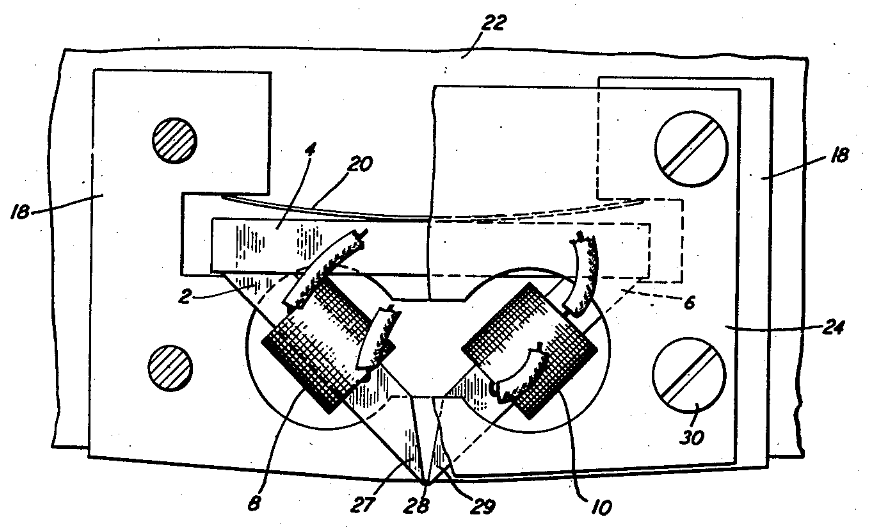
Fig. 1 is a front plan view of the assembled magnetic head with part of the front plate cut away.
Figure 2:
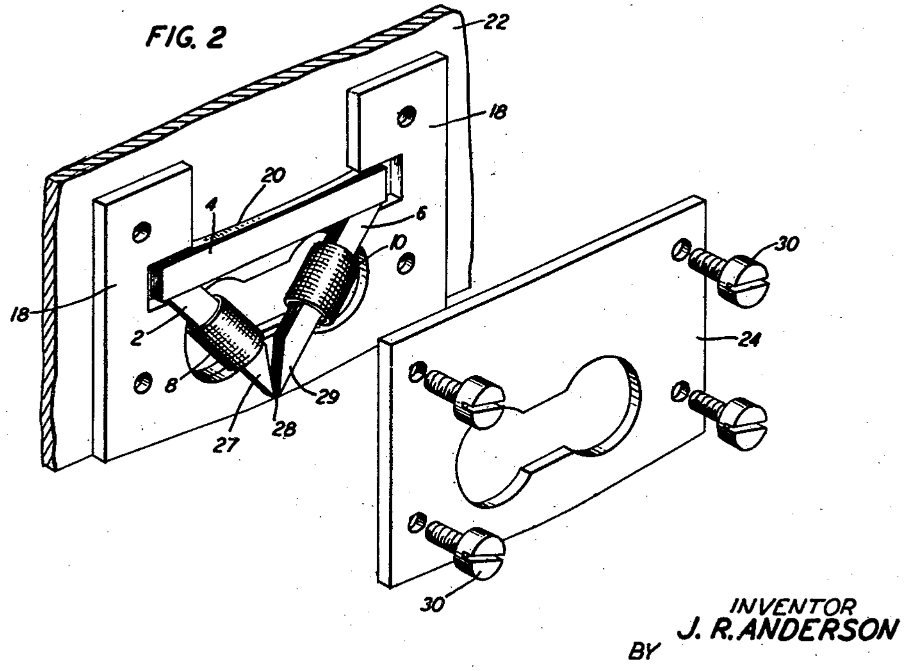
Fig. 2 is a view in perspective with the front plate removed showing the arrangement of the pole-pieces, coils, and eddy current shield.

In one embodiment of the invention, which is shown in Figs. 1 and 2, the triangular-shaped core comprises three laminated pole-pieces 2, 4 and 6 which comprise laminae of high permeability magnetic material having a thickness not greater than 0.001 inch. Pole-pieces 2 and 6 converge inwardly to provide a gap 28 and mounting means for the recording, reproducing and obliterating coils. This type of construction permits fabrication of the pole-pieces by cutting apart square or triangular cores of high permeability magnetic tape prepared in accordance with the process described in patent application Serial No. 565,890, filed November 30, 1944, by K. G. Compton and H. G. B. Gould. A practical method found for cutting the laminated core without splitting apart or damaging the laminae comprises the steps of casting the core in a casting resin, cutting the pole-pieces from said core and lapping them while in the casting resin, and then manually separating the cut pole-pieces from the casting resin. The casting resin acts as a disposable clamp for holding and backing up the magnetic material at all points during the cutting and lapping operations.

The arrangement of windings on pole-pieces 2 and 6 for recording and reproducing depends, of course, upon the electronic equipment to be used with the magnetic head. In the particular embodiment of the invention shown in Figs. 1 and 2 each of the winding systems 8 and 10 on pole-pieces 2 and 6, respectively, comprises a single layer winding. These windings may be connected series aiding, and recording and obliterating may be done with current through one or both of the windings. Both windings are used for reproducing. This arrangement appears to be most suitable where the reproducing process may be carried out after all recording has been completed.

Figure 3:
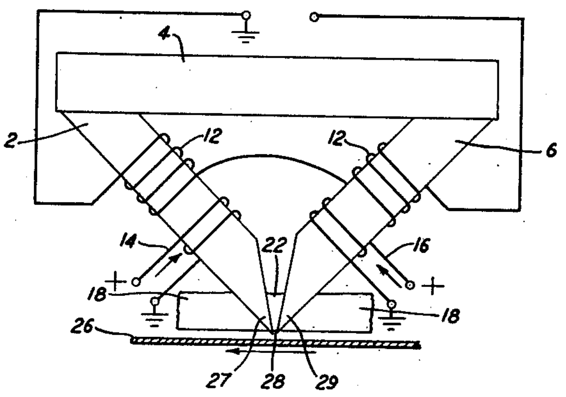
Fig. 3 is a functional sketch showing the recording head and the related recording medium.

As shown in Fig. 3, each of the winding systems 8 and 10 may be a double-layer system comprising a reproducing coil 12 having a relatively large number of turns, a recording coil 14 and an obliterating coil 16, each containing a small number of turns. The reproducing coils are connected series aiding. This type of arrangement may be preferred where large signals are required in reproduction and microsecond pulses are to be recorded.

Figure 4:
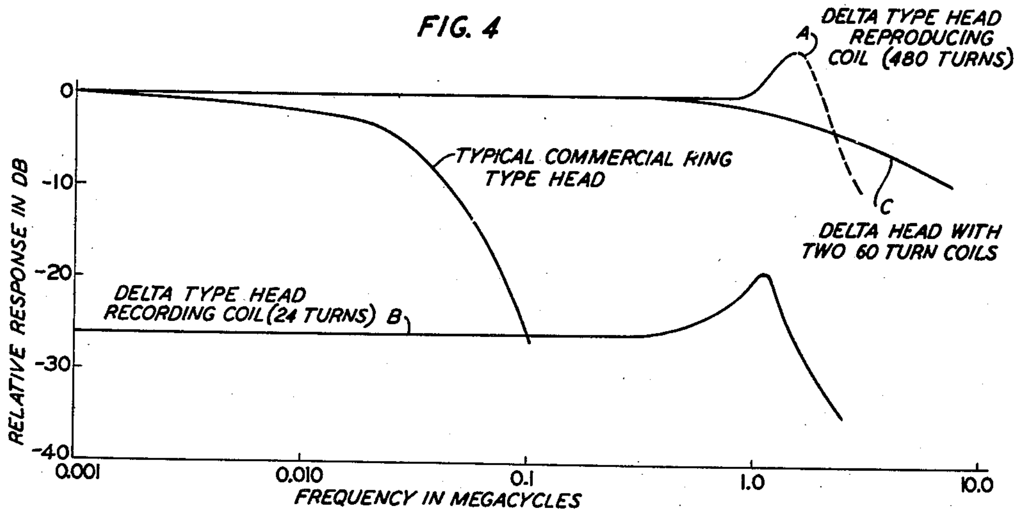
Fig. 4 shows a comparison of the frequency response of each of two delta heads employing specific winding systems with the response of a commercial ring-type head designed for audio frequency operation.

Fig. 4 shows the frequency response of flux in the recording-reproducing gap produced by current into the recording-reproducing coils of a typical commercial ring-type head, and delta heads with winding systems such as described above. Curves A and B were obtained with a delta head employing a double winding system such as shown in Fig. 3 wherein 480 turns were used for reproducing, 240 turns being wound around each of pole-pieces 2 and 6, and 24 turns were used for recording. The 24 turns for recording were wound around pole-piece 2 while 24 turns for obliterating were wound around pole-piece 6. Curve C was obtained with a delta head employing a single layer winding system such as shown in Figs. 1 and 2 wherein 120 turns were used for both reproducing and recording, 60 turns being wound around each of pole-pieces 2 and 6. The use of single-layer coils having low distributed capacitance and low capacitance to ground substantially improves the frequency response. As can be seen in Fig. 4, the coil resonance peak at one megacycle with 480 turns in the reproducing coils was eliminated by using two 60-turn coils. It has been found that, in addition to its wide frequency response, a recording head in accordance with the present invention is capable of recording short pulses in one-half the space required for commercial ring-type heads with an increase in efficiency of about fifty times.

As shown in Figs. 1 and 2 the pole-pieces are securely positioned within the guide plates 18 by means of a retaining spring 20, the back plate 22 and the front plate 24. The guide plates 18 are made of a shielding material such as copper and are the eddy current shields positioned directly in front and directly behind the pole tips 27 and 29 to prevent magnetic flux from reaching the recording medium 26 (see Fig. 3) at points other than that directly under the recording-reproducing gap 28. The retaining spring 20 may be made from a material such as Phosphor bronze, while the back plate 22 and front plate 24 are preferably made from a non-magnetic material such as nickel silver. The recording head may be assembled satisfactorily in the following manner. The guide plates 18 are affixed to the back plate 22 by soldering. In carrying out this step a jig may be employed in the conventional manner to assure that the supporting surfaces for pole-pieces 2 and 6 will converge at the specified angle and that the gap at the converging point will be sufficiently large to permit the knife edges of the pole tips to project beyond the eddy current shield elements 18 as shown in Figs. 1 and 2. The pole-pieces are then placed within the guides 18 and held in position with the cooperation of the retaining spring 20, coils 8 and 10 having previously been positioned about pole-pieces 2 and 6, respectively, and having been securely cemented thereto, and a shim having been positioned between the inwardly converging pole tips 27 and 29 of pole-pieces 2 and 6 to provide a gap of substantially 0.002 inch. The front plate 24 is then secured to the back plate 22 by means of screws 30 thereby clamping the pole-pieces in the position determined by the guide plates 18, the retaining spring 20 and the 0.002-inch shim placed between the pole tips of pole-pieces 2 and 6. The shim is then removed.

Recording heads in accordance with the present invention have been operated successfully in combination with a recording medium 26 comprising a cobalt-nickel plated brass cylinder having a diameter of 12.875 inches, the plating having the composition cobalt (85 per cent) and nickel (15 per cent) and being approximately 0.0002 inch thick. The system has been operated with the pole tips out of contact with the recording medium, a gap of approximately 0.002 inch being maintained between the pole tips and the medium, and with the cylinder revolving at a speed of 1770 revolutions per minute.

It is to be understood that the above-described arrangements are illustrative of the application of the principles of the invention. Other arrangements may be devised by those skilled in the art without departing from the spirit and scope of the invention.

What is claimed is:

1. An electromagnetic transducer comprising two pole-pieces and a yoke, said pole-pieces and yoke being of substantially the same thickness and width and comprising an equal number of laminations of magnetic material having a thickness of substantially 0.001 inch, said laminations of said pole-pieces being trapezoidally-shaped, said laminations of said yoke being rectangularly-shaped, adherence producing and insulating separators between said laminations, said separators forming a union between adjacent laminations, said pole-pieces and yoke being disposed in such manner as to form a stack of substantially identical triangularly shaped magnetic cores, said pole-pieces comprising knife-edged pole tips and converging to form a gap, each of said laminations in said yoke contacting a corresponding lamination in each of said pole-pieces, a non-magnetic eddy current shield, said pole-pieces disposed within said shield in such manner that substantially only the knife edges of said pole tips project from said shield.

2. An electromagnetic transducer in accordance with claim 1 wherein a coil for reproducing signals is disposed around each of said pole-pieces, said coils comprise the same relatively large number of turns and are connected in series aiding relation, a coil for recording signals is disposed around one of said pole-pieces, a coil for obliterating signals is disposed around the other of said pole-pieces and each of said recording and obliterating coils comprises a relatively small number of turns.

JOHN R. ANDERSON.

References Cited in the file of this patent

UNITED STATES PATENTS

| Number | Name | Date |
|---|---|---|
| 1,886,816 | Jensen | Nov. 8, 1932 |
| 1,941,476 | Jensen | Jan. 2, 1934 |
| 1,970,424 | Frink | Aug. 14, 1934 |
| 2,144,844 | Hickman | Jan. 24, 1939 |
| 2,263,485 | Clopton | Nov. 18, 1941 |
| 2,361,752 | Eilenberger | Oct. 21, 1944 |
| 2,381,463 | Potter | Aug. 7, 1945 |
| 2,456,767 | Camras | Dec. 21, 1948 |
| 2,459,299 | West | Jan. 18, 1949 |
| 2,469,444 | Roys | May 10, 1949 |
| 2,479,125 | Perreau | Dec. 18, 1949 |
| 2,483,123 | Clapp | Sept. 27, 1949 |
| 2,493,742 | Begun | Jan. 10, 1950 |
| 2,517,808 | Sziklai | Aug. 8, 1950 |
| 2,535,480 | Begun | Dec. 26, 1950 |
| 2,555,110 | Bobb | May 29, 1951 |
| 2,587,097 | Berlant | Feb. 26, 1952 |

FOREIGN PATENTS

| Number | Country | Date |
|---|---|---|
| 617,796 | Germany | Aug. 28, 1935 |